March 7, 1972     W. SIMON ET AL     3,647,666

MEASURING ELECTRODE FOR MEASURING OF IONS IN SOLUTIONS

Filed June 10, 1970

INVENTORS.
WILHELM SIMON
WILLI MÖLLER
RENÉ DOHNER

BY
*Maynard R. Johnson*
ATTORNEY

United States Patent Office 3,647,666
Patented Mar. 7, 1972

3,647,666
MEASURING ELECTRODE FOR MEASURING OF IONS IN SOLUTIONS
Wilhelm Simon, Oberembrach, Zurich, Willi Möller, Zurich, and René Dohner, Affoltern am Albis, Switzerland, assignors to Gebruder Moller, Glasblaserei Inhaber and Willi Moller, Zurich, Switzerland
Filed June 10, 1970, Ser. No. 45,191
Claims priority, application Switzerland, June 12, 1969, 8,994/69
Int. Cl. G01n 27/30
U.S. Cl. 204—195
13 Claims

ABSTRACT OF THE DISCLOSURE

A measuring electrode for measuring ions in solution comprises an electrically insulating cylindrical casing which contains a glass or plastics cylinder having open top and bottom ends and a transverse partition wall, and a detachable electrode base carrying the ion selective member and closing the bottom end of said cylinder to form a hollow space within the cylinder between said partition wall and the electrode base adapted to contain the reference solution. An internal reference electrode is immersed in the solution and sealingly leads through said transverse partition wall and extends to the top of the casing where it is connected to junction means. Means are provided to enable an easy exchange of the electrode base of the reference solution and of the ion-selective material.

Figure 1:
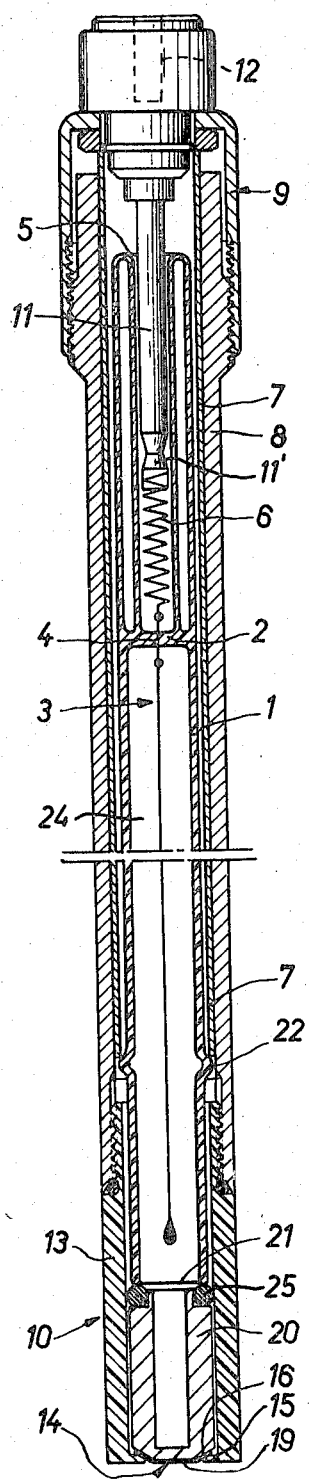

Measuring electrodes which serve for selective measurement of ions in solutions, are known since a long time. Particularly, electrodes which comprise a glass membrane as a ion selective member, i.e. the so-called glass electrodes are used in many fields of activity for the determination of the pH-index or for the determination of the activity of other special ions.

Lately, however, measuring electrodes have been developed which correspond in principle to the known glass electrodes which, however, have no glass membrane as an ion-selective member, but comprise materials containing another ion-selective component or are built-up from it. It shall be referred for example to the electrode systems described in the Swiss patent specification No. 479,870, which contain nonactin or its homologues, gramicidin and/or valinomycin as ion-selective component. Moreover, ionselective members have been described which represent an intimate mixture of a chemically inert material and an ion exchange material. Also, ion-selective members have been described already, which are solid bodies, for example crystalline solid bodies, or which consist of porous materials impregnated with a solution the solvent of which is insoluble in the solution to be measured, (see USA patent specification No. 3,431,182 or British patent specification No. 1,107,108). The measuring electrodes with ion-selective members known until now, however, had some considerable drawbacks. One of these drawbacks consists in that the reference solution which is in the interior of the electrode and in which is immersed an electrical conductor serving as internal reference electrode is contained in an open vessel, so that this solution had always to be replenished, for example owing to evaporation losses.

Another essential drawback of measuring electrodes in the base of which there is situated the ion-selective member, is that this ion-selective member can only be exchanged or replaced with difficulty for another one. Generally, the base of the electrode which comprises the ion-selective member is rigidly connected with the remainder of the electrode body and can hardly be separated therefrom.

A still further drawback of the hitherto known electrodes provided with an impregnated membrane, for example a paper membrane which is impregnated with a solution, consists in that the membrane is maintained in the electrode base in such manner that the mounting support projects beyond the membrane in the direction of the solution to be measured, so that a circular hollow space is situated at the bottom end of the measuring electrode, which space is surrounded by the annular mounting support. Also in known electrodes the ion-selective member of which is a solid body, the drawback can be observed that the surface of the solid body which is in contact with the solution to be measured, is situated in a depression, i.e. that the mounting device also in this case projects beyond the ion-selective member. In this respect, it shall be referred particularly to the form of embodiment which is described with respect to FIG. 3 or to FIG. 1 of the USA patent specifications 2,614,976 and 3,431,182, respectively. When the surface of the ion-selective member facing the solution to be measured is situated in a depression, then the inconvenience can be observed that upon immersion into solutions and during measurement, particularly with agitated or heated solutions, gas or steam bubbles will separate at the surface of the ion-selective member facing the solution to be measured and will lead to an adulteration of the measuring result.

It is an object of the present invention to provide a novel construction of a measuring electrode which avoids the above described drawbacks.

The measuring electrode according to the invention comprises an electrically insulating cylindrical casing having top and bottom ends, an axially adjustable cap closing the top end of said casing, an electrode base closing the bottom end of said casing, an ion-selective member carried by said electrode base, a cylindrical member extending within said casing, said cylindrical member having open top and bottom ends, a partition wall extending transversely of said cylindrical member intermediate the length thereof, and defining a space within said cylindrical member between said transverse partition wall and said electrode base and adapted to contain the reference solution, an electrical conductor terminating within said space and extending said cylindrical member longitudinally thereof, said electrical conductor sealingly leading through said transverse partition wall and having a conductor section extending within said cylinder member above said partition wall, an electrically conducting tube surrounding said cylinder member to form an electric screening member, said axially adjustable cap being provided with a contact plug extending into said cylinder member through the open top end thereof to conductively abut against said conductor section, and electrical junction means on said contact plug for extending said internal reference electrode out of the electrode structure.

When the internal conductor in the electrode according to the invention is a mercury-amalgam electrode the conductor section above said transverse partition wall can be of fixed length, usually, however, this conductor portion must be of variable length and preferably will be formed by a compression spring.

The invention shall be explained in detail by reference to the accompanying drawings in which, FIG. 1 is a vertical axial section of a complete measuring electrode having an electrode base which is particularly advantageous, when the ion-selective member is a liquid-impregnated, blade-shaped carrier material.

Figure 2:
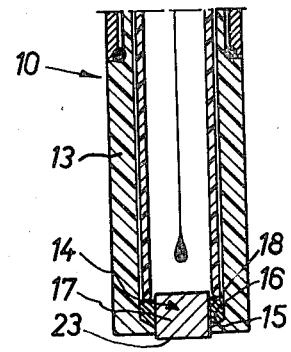

FIG. 2 shows an electrode base which, in a preferred embodiment, can be exchanged for the electrode base of FIG. 1, the electrode base shown in FIG. 2 comprising a block-shaped solid body as ion-selective member.

The measuring electrode shown in FIG. 1 comprises a cylinder 1 having a transversely situated partition wall 2 in which an electrical conductor 3 is sealingly embedded. The cylinder 1 comprises an upper cylinder orifice 5, a bead 22 and a lower cylinder orifice 21. The section of the electrical conductor 3 above the embedded place 4 is formed by a compression spring 6 directed towards the top end of the cylinder 1. From its upper end until the bead 22 the cylinder 1 is surrounded by an electrically conducting tube 7 serving as an electric screening, which tube may have a solid or a perforated wall, for example of a metal tube or a metal net. The conducting tube 7 is surrounded by an electrically insulating cylindrical casing 8 which is closed on the top by an axially adjustable cap 9 and at the bottom by the electrode base 10. The cap 9 is screwed on the casing 8 and comprises a central internal contact plug 11. This plug 11 forms a portion of the electrical current path of the internal reference electrode and penetrates into the cylinder 1 to abut against a contact plug 11' carried by the compression spring 6. The top of the contact plug 11 projects above the cap 9 and is provided with an electrical junction socket 12 for extending the internal reference electrode out of the measuring electrode.

The electrode base 10 shown in FIG. 1 comprises a sleeve 13, a blade-shaped ion-selective member 14. The bottom end of the sleeve 13 is provided with an internal flange 15 forming a conical or dished supporting surface 16 which is inclined toward the solution to be measured. When effecting a measurement with the described electrode the portion 19 of the blade-shaped carrier material which is flush with the bottom end of the sleeve 13 or may slightly project beyond this bottom end, makes contact with the solution to be measured. The member 14 is held by a detachable clamping piece 20 introduced into the sleeve 13, only the portion 19 of the blade-shaped carrier material being in contact with the solution to be measured, while the supporting surface 16 of the flange 15 is so formed that by means of the clamping piece 20 a squeezing and sealing of the liquid-impregnated carrier material situated therebetween is ensured.

In FIG. 2 an electrode base 10 is shown which comprises a block-shaped solid body 17 as the ion-selective member. This block-shaped solid body 17 is embedded in an elastic annular support 18 preventing the passage of liquid between the block-shaped solid body 21 and the elastic carrier 18, and also ensuring a seal between the elastic carrier 18 and the supporting surface 16. The surface of the block-shaped solid body 17 which is in contact with the liquid to be measured during use of the measuring electrode is designated by 23. In this case the surface 23 of the block-shaped solid body 17 projects outwardly beyond the bottom of the tube 13.

An exchange of the electrode base is possible, and can be obtained by a plug and socket connection or a screw connection.

The cylinder 1 and the partition wall 2 can consist of glass or of plastics; when using glass the electric conductor 3 can be sealed into the partition wall 2. When the electrode base 10 of the measuring electrode is connected with the casing 8, then the space 24 containing the reference solution into which the internal reference electrode is immersed, is completely sealed. Thus, even after a long use of the electrode a replenishing of the reference solution is not necessary. On the other hand, it is possible to effect an easy exchange of the electrode base 10 by turning the axially movable cap 9, for example by slightly screwing the cap in or out. When in the electrode shown in FIG. 1 the cap 9 is screwed outwardly, the tube 7 is no longer applied against the bead 22 of the cylinder 1, whereby the annular seal 25 between the lower orifice 21 of the cylinder 1 and the clamping piece 20 (see FIG. 1) or the elastic support 18 (see FIG. 2) is abolished. In like simple manner as the abolishment of the seal or the exchange of an electrode base for another one, or the exchange of the reference solution can be effected, it is possible, after the exchange has been made to again obtain the desired seal by another axial movement of the cap 9 in downward direction.

The sleeve 13 of the electrode base 10 preferably is a plastic sleeve in both forms of embodiment shown. The elastic support 18 which is used in the electrode base shown in FIG. 2, preferably is made of rubber-elastic material, for example of silicone rubber. By means of the measuring electrode according to the invention, it is possible to effect a rapid exchange of the electrode base. Moreover, when a blade-shaped, impregnated material is used, the electrode base shown in FIG. 1 guarantees a minimum stressing of this material, so that also impregnated filter paper or other mechanically delicate support materials may be used with advantage as blade-shaped ion-selective material. If the blade-shaped support material has been damaged, or when a replacement of such a liquid-impregnated material is desired by a material which is impregnated with another liquid, this exchange is easily possible with the measuring electrode according to the invention. The measuring electrodes having an ion-specific member formed by a liquid-impregnated sheet material, as well as those in which this member is a block-shaped solid body, are advantageously so formed that the surface of the ion-specific member directed towards the solution to be measured is flush with the bottom side of the sleeve 13 or slightly projects outwardly beyond the same, so that the formation of a cavity is avoided at the bottom of the electrode base, in which air bubbles might separate.

What is claimed is:

1. A measuring electrode assembly for measuring ions in solutions, comprising:
    an electrically insulating cylindrical casing having top and bottom ends,
    an axially adjustable cap closing the top end of said casing,
    an electrode base closing the bottom end of said casing,
    an ion-selective member carried by said electrode base,
    a cylindrical member extending within said casing,
    said cylindrical member having open top and bottom ends,
    a partition wall extending transversely of said cylindrical member intermediate the length thereof, and defining a space within said cylindrical member between said transverse partition wall and said electrode base and adapted to contain the reference solution,
    an electrical conductor terminating within said space and extending said cylindrical member longitudinally thereof,
    said electrical conductor sealingly leading through said transverse partition wall and having a conductor section extending within said cylinder member above said partition wall,
    an electrically conducting tube surrounding said cylinder member to form an electric screening member,
    said axially adjustable cap being provided with a contact plug extending into said cylinder member through the open top end thereof to conductively abut against said conductor section,
    and electrical junction means on said contact plug for extending said internal reference electrode out of the electrode structure.

2. An electrode assembly according to claim 1, in which said electrode base includes an electrically insulating sleeve having an internal flange at its bottom end adapted to support and seal said ion-selective member, said flange tapering towards the axis of the sleeve to form an internal supporting surface inclined towards the free end of the sleeve.

3. An electrode assembly according to claim 2, in which said ion-selective member is formed by a solid block-shaped member embedded in an elastic annular support sealingly clamped between said internal flange and the bottom end of said cylinder member.

4. An electrode assembly according to claim 3, in which said annular support is rubber-elastic and consists of silicone rubber.

5. An electrode assembly according to claim 2, in which said ion-selective member consists of a liquid-impregnated blade-shaped carrier material sealingly engaged between the internal supporting surface of said flange and a clamping piece detachably inserted into said electrically insulating sleeve and sealingly abutting against the bottom end of said cylinder member.

6. An electrode assembly according to claim 5, in which said clamping piece consists of insulating plastics material.

7. An electrode assembly according to claim 2, in which said electrically insulating sleeve consists of plastic material and is detachable connected to said electrically insulating casing.

8. An electrode assembly according to claim 1, in which said electrical conductor section is formed by a compression spring.

9. A measuring electrode according to claim 1, in which said cylinder member and partition wall consist of glass.

10. An electrode assembly according to claim 1, in which said cap is screwed to said cylindrical casing and is axially adjustable by screwing it on or off.

11. An electrode assembly according to claim 1, in which said electric screening member is supported on an annular bead formed on said cylinder member and abutting against said axially adjustable cap.

12. An electrode assembly according to claim 1, in which the surface of said ion-selective member, which is to be moistened with the solution to be examined is substantially flush with the bottom end of said electrode base.

13. An electrode assembly according to claim 1, in which the surface of the ion-selective member to be moistened by the solution to be examined projects beyond the bottom end of the electrode base.

References Cited

UNITED STATES PATENTS

| | | | |
|---|---|---|---|
| 2,986,511 | 5/1961 | Digby | 204—195 |
| 3,444,068 | 5/1969 | Leonard et al. | 204—195 |
| 3,448,032 | 6/1969 | Settzo et al. | 204—195 |
| 3,476,672 | 11/1969 | Snyder et al. | 204—195 |
| 3,492,216 | 1/1970 | Riseman et al. | 204—195 |
| 3,562,130 | 2/1971 | Hoole et al. | 204—195 |

FOREIGN PATENTS

| | | | |
|---|---|---|---|
| 667,471 | 3/1952 | Great Britain | 204—195 |

GERALD L. KAPLAN, Primary Examiner